(12) United States Patent
Smith et al.

(10) Patent No.: US 8,715,615 B2
(45) Date of Patent: May 6, 2014

(54) RECOVERY OF HIGH PURITY LEAD OXIDE FROM LEAD ACID BATTERY PASTE

(75) Inventors: W. Novis Smith, Philadelphia, PA (US); Steven A. Kinsbursky, Anaheim, CA (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 13/135,577

(22) Filed: Jul. 6, 2011

(65) Prior Publication Data

US 2014/0023574 A1    Jan. 23, 2014

(51) Int. Cl.
*C01G 17/02* (2006.01)
*C01G 19/02* (2006.01)

(52) U.S. Cl.
USPC ............................................. 423/618; 423/89

(58) Field of Classification Search
USPC .................................................... 423/618, 89
See application file for complete search history.

(56) References Cited

U.S. PATENT DOCUMENTS

| | | | | |
|---|---|---|---|---|
| 4,460,442 A | * | 7/1984 | Ducati | 205/599 |
| 4,756,888 A | * | 7/1988 | Gallup et al. | 75/712 |
| 7,507,496 B1 | * | 3/2009 | Kinsbursky et al. | 429/49 |
| 2010/0040938 A1 | * | 2/2010 | Kumar et al. | 429/49 |

* cited by examiner

*Primary Examiner* — Melvin Curtis Mayes
*Assistant Examiner* — Melissa Stalder
(74) *Attorney, Agent, or Firm* — RatnerPrestia

(57) ABSTRACT

The invention relates to the low temperature recovery of lead oxide (PbO) from lead acid battery paste through the preparation of lead carboxylate from the battery paste and the conversion of the lead carboxylate to PbO.

10 Claims, No Drawings

RECOVERY OF HIGH PURITY LEAD OXIDE FROM LEAD ACID BATTERY PASTE

FIELD OF THE INVENTION

The invention relates to the recovery of lead oxide (PbO) from spent lead acid battery paste through the preparation of lead carboxylate which is then converted to PbO.

BACKGROUND OF THE INVENTION

The recovery of high purity lead oxide materials (99.99+ %) from lead acid pastes has been a long standing requirement with the lead battery manufacturers. The lead has value only as a high purity material. Currently the commercial practice is to send this paste recovered from crushing lead batteries to the lead smelters who separately process this mix of red lead, lead sulfate with carbon to obtain a crude lead metal product. This lead metal is then separately reacted with flux and air to remove the contaminating impurities such as antimony, barium, calcium, sulfur, copper, arsenic and other metals.

Russian patent No. 2,398,758 to Pozhidaeva discloses a method of producing lead acetate by reacting lead metal and lead dioxide with acetic acid in the presence of an organic solvent and a stimulating iodine additive wherein lead dioxide is the reagent and oxidant with acetic acid to produce lead acetate.

In U.S. Pat. No. 4,222,769 spent battery paste is desulfurized and then transformed into metallic lead by roasting in the presence of a carbon reducing agent.

U.S. Pat. No. 4,769,116 discloses treating exhausted lead acid battery paste with sodium hydroxide to produce a solution of sodium sulfate and a desulfurized paste which is subjected to electro winning to produce metallic lead.

International Publication No. WO99/44942 discloses a process of producing lead monoxide from spent lead battery paste using fluxing agents and an organic reducing agent in a calcination step at a temperature of 400° C.-450° C.

U.S. Patent Publication No. 2010/043600 to Martini discloses a process for recovery high purity lead compounds from electrode paste slime. The process includes dissolving lead oxide in the paste in a suitable acid, reducing any insoluble lead dioxide with hydrogen peroxide, a sulfite or sulfurous anhydride, converting the lead oxide to lead sulfate and then treating the lead sulfate in a solution containing an acetate salt. The lead sulfate is then converted to a carbonate salt, oxide or hydroxide.

U.S. Patent Publication No. 2006/239903 discloses the production of lead hydrate or monoxide from residues containing lead in the form of sulfates, monoxides, etc. followed by the desulphurization of battery paste with a suitable carbonate or hydrate, calcinating the desulfurized material to get impure lead monoxide followed by leaching of the lead monoxide with acetic acid, followed by filtering and then treating with an alkaline hydroxide or alkaline earth hydroxide to obtain soluble acetates to get a precipitate of lead hydrate or lead monoxide.

U.S. Pat. No. 7,507,496 to Smith et al relates to the selective removal of sulfate from battery paste and recovering $Pb_3O_4$ which has small amounts of impurities and can be separated from the impurities by dissolution.

The prior art methods get high yields of lead oxide at the expense of purity or in the alternative high purity at the expense of yield.

It is therefore desirable to obtain both high yield and high purity when treating spent acid battery paste to obtain lead oxide.

SUMMARY OF THE INVENTION

According to the invention, lead monoxide (PbO) is prepared from spent lead acid battery paste at lower temperatures by the steps comprising;
A) treating said paste with an alkaline hydroxide at a pH of at least 12;
B) filter the mixture from Step A) and washing the filter cake to reduce the pH below 9 so as to remove any sulfates;
C) reacting the filter cake with a carboxylic acid having 1-3 carbon atoms and a reducing agent;
D) filtering the product of step C);
E) treating the resulting filtrate with concentrated alkali hydroxide at a temperature of 50-100° C. to form pure litharge PbO under an inert atmosphere, and then
F) recovering litharge PbO.

Advantageously, the reducing agent is an aldehyde such as glyoxal.

It is therefore an object of the invention to recover PbO from spent lead acid battery paste.

It is another object of the invention to prepare lead acetate from spent lead acid battery paste for use in producing PbO.

A further object of the invention is to prepare lead carboxylate for use in preparing PbO.

DESCRIPTION OF THE PREFERRED EMBODIMENTS

According to the present invention, lead monoxide (PbO) can be prepared in high yields and high purity from spent lead acid battery paste. The present process initially removes any sulfur containing compounds which is primarily all of the sulfate containing compounds. The lead oxides present then undergo the following reaction:

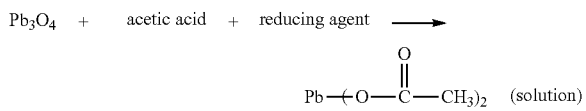

The lead acetate is treated with an alkaline hydroxide according to the formula:

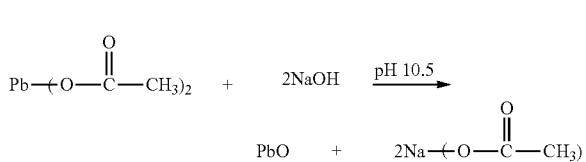

More particularly the present process comprises the steps of:
A) treating spent lead battery paste with an alkali hydroxide so as to remove any sulfates in solution and to obtain $Pb_3O_4$;
B) reacting the $Pb_3O_4$ from step A) with a carboxylic acid having 1-3 carbon atoms in the presence of a reducing agent;
C) filtering the product from step B) and reacting the filtrate with concentrated alkali hydroxide at a temperature of 50-100° C. under an inert atmosphere at a pH of at least 12 to obtain pure litharge PbO.

Step A) is carried out at a pH of at least 13 and at a slightly elevated temperature, for example 60-70° C.

The inert gas in Step C) can be argon, nitrogen, $CO_2$, or free air so as to protect the reaction from carbon dioxide.

The $Pb_3O_4$ has microscopic small amounts of insoluble antimony/lead alloy pieces (−325 mesh) and barium sulfate (about 0.3% barium and about 0.5% antimony depending on the battery sources and crushing method). Further $Pb3O_4$ must be dissolved away from these impurities which then can be filtered off from the solution of the soluble lead compound such as lead acetate. Only PbO is soluble in acetic acid and the $Pb_3O_4$ must be reduced to PbO to be soluble. Any process which does this must be low cost and require minimum energy since they must compete with the currently used smelting process.

It has been found that it is advantageous to remove the sulfate first to avoid contaminating any downstream processing with sulfate or sulfur. Then taking this insoluble red lead ($Pb_3O_4$) product with no contaminating sulfur compounds and dissolving it in one step. This is most efficiently performed by converting the insoluble $PB_3O_4$ to the very soluble lead (II) carboxylate, preferably acetate in one step by adding an organic reducing agent at the same time as the carboxylic acid is added to an agitated aqueous suspension of the essentially sulfur free (sulfate free) $Pb_3O_4$ (less than 0.6% sulfate). The stirred and warmed slurry turns from red to gray and almost (>91%) all of the lead dissolves as a solution of lead carboxylate. This solution is filtered and the filter cake contains all of the antimony for recovery and the very insoluble barium sulfate and about 50% lead as the insoluble lead/antimony alloy.

The alkali hydroxides which can be used include sodium hydroxide and potassium hydroxide.

The reducing agents which can be used include sorbitol, soluble cellulosic material, starch, glyoxal or other reducing aldehydes.

The percentage of the ingredients used herein is "by weight". The spent battery paste can be obtained from spent battery paste as disclosed in U.S. patent application Ser. No. 11/006,279 which is herein incorporated by reference.

It has further been found that the 100% litharge (orange form) which is produced under the preferred conditions of the present process can be mixed with 25% by weight molten lead metal under nitrogen or inert atmosphere with vigorous stirring to quickly produce the preferred industrial starting material for making lead acid batttery electrodes called leady oxide or leady lead oxide. The preferred leady oxide contains 25% lead and 75% PbO as litharge. This material is usually produced commercially in a Barton reactor or ball mill at 480-550° C. in air requiring many hours of stirring and heating resulting in excessive heat and energy. The actual final composition from these commercial processes is difficult to control due to the many variables involved so that the actual composition range will run 15-30% lead metal content. In addition, it is preferred to have 100% of the PbO as the litharge form, but in practice the higher temperature massicot (yellow-white) form is also present due to the excessive heating required. This new process of taking very pure 100% litharge and mixing with molten lead metal at 400-450° C. under nitrogen to prevent any oxidation of the lead while the rapid quick mixing occurs is a major step forward for achieving a low cost, very high purity material with a precise composition which is desired by the lead acid battery manufacturers. This new leady oxide material which has not been available before due to the high cost by other routes, lack of control, and need for the high purity litharge produced by this process is an important advance for the lead acid battery industry.

Not only does the present described process safe significant energy, it reduces sulfur emissions compared to smelter recycling, it also produces a very pure highly desired, and higher performing leady oxide at lower cost.

EXAMPLE 1

A. 340 g equivalent as dry solids, but as the damp or slurry lead paste from the lead battery breaker and 1-liter water are added to the 2-1 PFA plastic wide mouth jar with stirrer used as a reactor. A heating tape was wrapped around this container to provide a means of heating this reactor to 60-70° C. Approximately 146 g of 50% NaOH solution were carefully added and the pH checked (should be 12 or greater). The mixture was stirred and heated and the pH was adjusted with small amounts of additional NaOH solution to maintain the pH>11 as the reaction mixture was heated and stirred for 3 hours. The slurry was filtered and the cake washed until the wash is below pH 9. The damp washed dark red cake (free of essentially all of the sulfate) was dispersed in 1600 ml of water in the 2-liter PFA plastic wide mouth jar with stirrer which was again used as the reactor. This mixture was stirred and 280 g of acetic acid was added. 150 g of 40% glyoxal were then added carefully. A slight exotherm was noted. The mixture was heated at 40-60° C. with stirring until the paste turned gray and almost completely dissolved leaving about 6% gray particulate in the slurry. This step took 3 hours. The slurry was filtered warm (40-50° C.) using plastic filter flask and the filter cake washed. (The gray black filter cake weighed about 35 g and contained 8% antimony, 50% lead, and 5% barium.) The clear pale yellow filtrate contained >90% recovery of the original lead as lead acetate. (No silica or glass is used in this processing to minimize silica contamination which will interfere with the conversion of the lead acetate to pure litharge with no massicot phase.).

B. The warm filtrate from step A. was heated to about 70° C. and then poured into a 2-1 PFA reactor (90° C.) with good stirring containing 520 g of 50% NaOH at >85° C. under nitrogen to protect it from carbon dioxide. (Some cooling was necessary at this point to maintain the temperature below 105° C.) The pH was monitored so that only enough extra NaOH was added to maintain the pH above 12. The slurry heated for 30 minutes at 105° C. and then filtered hot. The orange litharge cake is washed until neutral and then dried to produce PbO litharge with high purity. Yield was 290 g (90%) based on the starting lead content in the red lead acid battery paste with the sodium <30 ppm.

EXAMPLE 2

339 g dry lead acid battery breaker paste (−170 mesh) was added to 400 ml water and stirred. (This was a mixture of lead sulfate, red lead and impurities, primarily 0.3% barium as barium sulfate and 0.5% antimony as complex lead alloy and insoluble compounds. The lead content was 78.1% or 265 g lead.) To this slurry was added 73 g of 50% sodium hydroxide and the slurry heated to 90° C. for 3 hours. The slurry was cooled and filtered and washed free of base with water.

The resulting dull red brown filter cake was suspended in 600 ml water in a 1-1 reaction flask with stirring and 180 g acetic acid added. Then 15 g of 40% glyoxal was added. The mixture was slightly exothermic and warmed to 40° C. 32 g more of 40% glyoxal was added and heated to 67° C. with some exothermic reaction assisting and some foaming. The mixture was heated at 67-75° C. for 4 hours, cooled to 25° C. and filtered. (The gray insoluble filter cake containing the impurities weighed 19 g when dry and analysis showed barium 5.28%; antimony 8.00%; lead 53.0%).

To the stirred clear pale yellow filtrate solution in a polyetheylene container was added 160 g 50% sodium hydroxide with stirring to bring the pH to 10-11 to obtain litharge PbO.

EXAMPLE 3

A. The lead acetate filtrate solution of step A of Example 1 was alternatively added slowly to a 2-1 PFA reactor (no heating required) equipped with good stirring under nitrogen. 520 g of dilute NaOH was slowly added with good stirring. (Some cooling was applied to maintain the temperature below 25° C.) The pH was monitored so that only enough NaOH was added to achieve a pH of 10.5 at the finish. The slurry was filtered and the cake washed and then dried at below 50° C. to produce $Pb(OH)_2$.

B. The lead hydroxide from Step A. was heated in a furnace at 250° C. for 2 hours to convert it to PbO as litharge.

EXAMPLE 4

The concentrated lead acetate solution from Step A of Example 1 can be poured directly into hot aqueous solution containing at least 5% excess sodium or potassium hydroxide to directly form the high purity PbO as litharge.

Although the invention has been described with preferred embodiments, it is understood that variations may be employed without departing from the concept of the invention as defined in the following claims.

What is claimed is:

1. A low temperature process for recovering high purity lead oxide (PbO) from a lead acid battery paste which comprises the steps of:
   A) reacting lead acid battery paste with an alkali hydroxide to remove any sulfates and to form $Pb_3O_4$;
   B) reacting the $Pb_3O_4$ with a carboxylic acid having 1 to 3 carbon atoms and a reducing agent to form lead carboxylate; and
   C) reacting the lead carboxylate under an inert atmosphere at an elevated temperature with concentrated alkali hydroxide to form PbO.

2. The process of claim 1 wherein the alkali hydroxide used in step A) is selected from the group consisting of sodium hydroxide and potassium hydroxide.

3. The process of claim 1 wherein the carboxylic acid is acetic acid and the lead carboxylate is lead acetate.

4. The process of claim 1 wherein the carboxylic is formic acid and the lead carboxylate is lead formate.

5. The process of claim 1 wherein the reducing agent is selected from the group consisting of sorbitol, soluble cellulosic material, starch and glyoxal.

6. The process of claim 1 wherein reacting the lead carboxylate under an inert atmosphere at an elevated temperature with concentrated alkali hydroxide to form PbO is carried out at a pH of about 12.

7. A process for recovery of high purity lead oxide (PbO) from lead acid battery paste which comprises the steps of:
   a) reacting lead acid battery paste with sodium hydroxide at a temperature of about 60-70° C. at a pH greater than 10 to form a first slurry;
   b) filtering the first slurry to form a filter cake;
   c) reacting the filter cake with acetic acid to form a first solution;
   d) treating the first solution with glyoxal to form a second slurry;
   e) filtering the second slurry to obtain a filtrate containing lead acetate; and then
   f) treating the filtrate with sodium hydroxide under a nitrogen atmosphere at a pH of about 12 to form a third slurry, and then
   g) filtering the third slurry to recover litharge PbO.

8. The process of claim 7 wherein the pH in step a) is at least 13.

9. The process of claim 7 wherein the second slurry of step d) is heated to about 40-60° C. during forming.

10. The process of claim 7 wherein the temperature in step f) is maintained below 105° C.

* * * * *